United States Patent [19] [11] 3,753,113
Maruta et al. [45] Aug. 14, 1973

[54] MULTILEVEL CODE SIGNAL TRANSMISSION SYSTEM

[75] Inventors: Rikio Maruta; Kiyoaki Kawai, both of Minato-ku, Tokyo, Japan

[73] Assignee: Nippon Electric Company, Limited, Tokyo, Japan

[22] Filed: June 21, 1971

[21] Appl. No.: 155,200

[30] Foreign Application Priority Data

| | | |
|---|---|---|
| June 20, 1970 | Japan | 45/53615 |
| Jan. 21, 1971 | Japan | 46/1852 |
| Mar. 22, 1971 | Japan | 46/16652 |

[52] U.S. Cl. .... 325/38 A, 340/347 DD, 179/69.5 R
[51] Int. Cl. .... H04b 1/00
[58] Field of Search .... 325/38 A, 41, 42; 340/347 DD, 348, 352, 355; 178/68, 69.5 R

[56] References Cited

UNITED STATES PATENTS

| | | | |
|---|---|---|---|
| 3,623,078 | 11/1971 | Waiting | 340/347 DD |
| 3,611,141 | 10/1971 | Waters | 325/38 |
| 3,587,088 | 6/1971 | Framaszek | 325/38 X |
| 3,569,955 | 3/1971 | Maniere | 340/347 |
| 3,521,274 | 7/1970 | Sawai | 325/38 X |
| 3,369,229 | 2/1968 | Dorros | 340/347 DD |
| 2,700,696 | 1/1955 | Barker | 325/38 X |

*Primary Examiner*—Charles D. Miller
*Attorney*—Richard C. Sughrue, Robert J. Seas, Jr. et al.

[57] ABSTRACT

A binary code is converted into a multilevel code having an average value of zero over a period of time. A group of $n$ multilevel digits is generated representing the same information conveyed by $m \times n$ binary bits. Each digit is a $(2^m + k)$-level digit. One of said $n$ digits represents the information content of $m-1$ binary bits as well as polarity inversion and synchronization information. The remaining $n-1$ multilevel digits represent the information content of the remaining $m(n-1)+1$ binary bits. The integral of the transmitted $n$-digit codes is converged to zero level. The transmitted $n$-digit codes are integrated by continually adding the sum of the levels of the transmitted code to the stored sum to generate a new sum or integral. The sign of the integral is compared with the sign of the sum of levels of the currently generated n-digit code. If the signs are the same, each digit of the $n$-digit code is polarity inverted. The first of the $n$ digits uses only levels of one polarity when the $m-1$ binary bits are converted into a single multilevel digit. Consequently, whether or not any given $n$-digit code has been polarity inverted can be detected by detecting the polarity of the first digit. Thus, the first digit carries the total information of $m$ bits by using one of $2^m$ levels excluding $k$ preselected levels. The remaining $(n-1)$ digits are not inhibited to use those preselected levels. However, the first digit is not at those preselected levels. This feature is used at a receiver to obtain word or block synchronization. At the receiver, a sync pulse is generated for every $n$ digit received. If the receiver is synchronized properly, the sync pulse will be in time coincidence with the first digit of each $n$-digit code. The presence of one of those preselected levels in coincidence with any sync pulse indicates an out of phase condition and the sync pulse is shifted by one digit time.

5 Claims, 12 Drawing Figures

United States Patent [19]
Maruta et al.
[11] 3,753,113
[45] Aug. 14, 1973
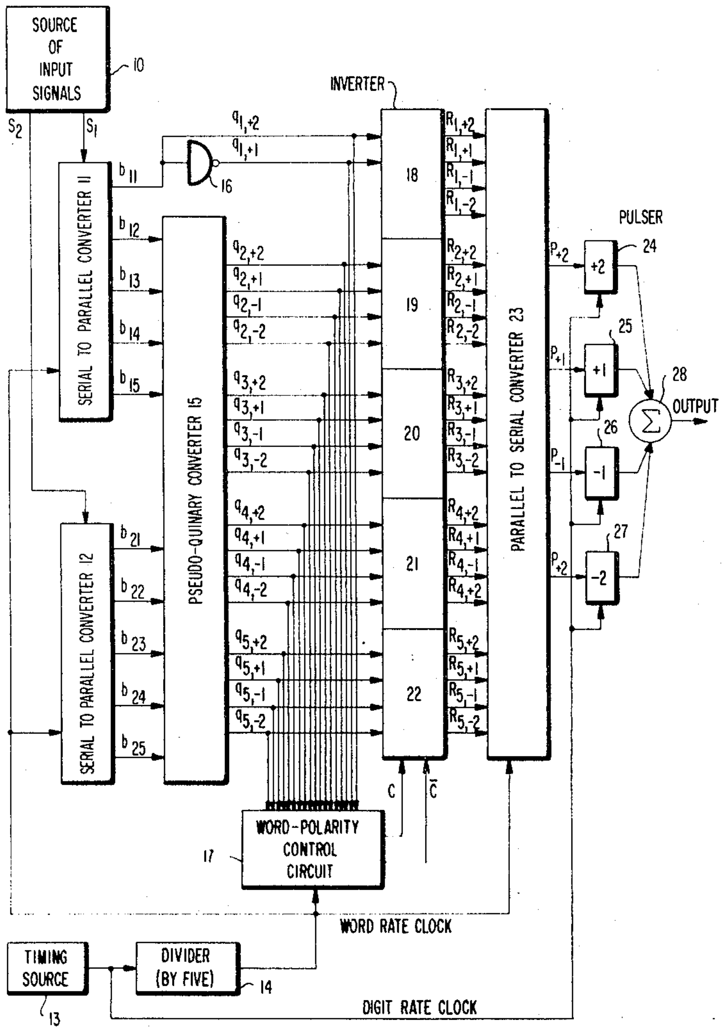

MULTILEVEL CODE SIGNAL TRANSMISSION SYSTEM

This invention relates to a transmission system utilizing pulse technique and, more particularly, to a multilevel code signal transmission system using regenerative repeaters.

In the PCM transmission system, the use of regenerative repeaters serves to prevent the signal-to-noise ratio from being degraded during transmission. The PCM system, however, requires wide transmission band. Recently, with requirement for higher speed PCM, the balanced pair cable has been replaced with the coaxial cable for use as a transmission medium. The coaxial cable causes no cross talk and maintains desirable transmission characteristics. The coaxial cable is therefore suited for the transmission of multilevel code signals.

In the transmission system using multilevel signals, the transmission capacity of one digit can be increased and, hence, the transmission band can be compressed. In other words, the multilevel code transmission system is suited for high capacity PCM transmission.

In the multilevel code transmission, the AC coupling repeater is generally employed in consideration of power feed convenience to repeaters and of reducing longitudinal current. The use of such repeater gives rise to "base line (or DC) wander" where the base line of the pulse code train drifts, to cause error in the code discrimination and regenerative operation. This problem cannot be removed unless a suitable arrangement be made to regulate regeneration of the multilevel pulse train. To this effect, the signal must be coded so that the DC component of the multilevel pulse train is kept zero regardless of the pattern of the codes generated at the information source and a certain amount of redundancy must be introduced into the multilevel code format. This redundancy, however, must be minimum in view of transmission efficiency. This is why a reasonable balance must be established between the redundancy and the transmission efficiency. Besides this requirement, the following conditions are supposed to be satisfied when determining the multilevel code format.

1. The length of the chain of zeros in a multilevel code train must be relatively short, and the timing signal must be unfailingly extracted at a high stability from the code train itself by the use of a circuit obtainable at a moderate cost.
2. In order to minimize the amount of redundancy introduced into the multilevel code format to increase the transmission efficiency, it is desirable to treat several digits as one block (word) and to convert the codes block by block (or word by word). To do this, the code must be inversely converted on the receiving side through block synchronization and, hence, the multilevel code format must contain block synchronizing data in a stably extractable form.
3. The line error rate must be monitored in the in-service condition. For this purpose, the multilevel code format must have a code error detecting capability.
4. Furthermore, the multilevel code transmission system is supposed to permit easy conversion between the codes of the information source and the multilevel code format and can be produced at a reasonable cost.

In view of the foregoing, the first object of this invention is to provide a multilevel code transmission system using the balanced multilevel code format which is hardly affected by the low frequency cut-off characteristic of the transmission line.

The second object of this invention is to provide an economical digital transmission line using the balanced multilevel code format which makes high transmission efficiency available.

The third object of this invention is to provide a multilevel code transmission system in which the relationship between the bit speed of source binary code and the transmission speed of multilevel code is determined to be synchronous at a ratio of integers, and the exchange of clocks between the terminal equipment and the repeater is simplified.

The fourth object of this invention is to provide a multilevel code transmission system in which the timing signals can be stably extracted regardless of the state of the code train generated at the information source.

The fifth object of this invention is to provide a multilevel code transmission system in which the block synchronization signal necessary for converting a multilevel code into the original code can securely be extracted at a high stability from the code train.

The sixth object of this invention is to provide a multilevel code transmission system in which the line error rate can be easily monitored in the in-service condition.

The seventh object of this invention is to provide a code conversion system in which the binary code can be easily converted into a $(2^m+k)$ level code and vice versa.

The eighth object of this invention is to provide a novel method in which the code train is balanceably controlled by using the integrated value of the output multilevel code train.

In the system according to this invention, the input binary code train supplied from the terminal equipment is divided every $(m \times n)$-digit, and each digit block is treated as one code word. On the transmission side, the binary code word of $(m \times n)$ digits is converted into a code word of $(2^m+k)$-level $n$ digit.

In the code conversion used herein, $(n-1)$ digits of the $n$-digit multilevel code word is used to represent the information content of $m(n-1)+1$ binary bits of the $(m \times n)$ bit binary code. It will be appreciated that this conversion is possible only if total number of codes possibly represented by $m(n-1)+1$ binary bits is less than or equal to the total number of codes which can possibly be represented by $n-1$ digits, each of which is a $(2^m+k)$-level digit. The required condition is:

$$2^{m(n-1)+1} \leq (2^m+k)^{n-1} \quad (1)$$

The rest of $(m-1)$-bit of the binary word is transmitted by the use of the remaining digit of the $n$-digit word, hereinafter referred to as the control digit. It is noted that the symbols $m$, $n$ and $k$ denote positive integers, and $m$ represents the ratio of information transmission rate (bits/sec) to signaling rate (baud). The symbol $k$ represents the number of additional levels ($k < 2^m$), used for introducing the redundancy. The smaller the value $k$, the higher will be the transmission efficiency. Normally, therefore, $k$ often takes the value 1. The symbol $n$ denotes the word length of the output multilevel code having a certain definite minimum value satisfying the condition (1) with respect to $m$ and $k$.

Unless a suitable restriction is made on generation of input code train, the $(2^m+k)$-level $n$ digit code word obtained according to the condition (1) causes base-line-wander when the signal is transmitted over a transmission line having a low frequency cut-off characteristic because this signal contains a non-zero DC component, even under the condition that $(2^m+k)$-number of levels are arranged symmetrical with respect to polarity. This base line wander makes it difficult to discriminate and regenerate the code correctly. To avoid this problem, the polarity of the integrated value of the output multilevel code sequence is compared with that of the DC component of the code word which is to be subsequently sent out, and the polarity of this code word is inverted so that the two polarities become inverse to each other, namely the integrated value is converged to zero. By such negative feedback control, the code train to be transmitted is balanced and hence the DC component is made zero. Thus the multilevel code train is less affected by the influence of low frequency cut-off characteristic.

It is necessary to notify the receiving side of presence or absence of polarity inversion of the transmitted code word so as to permit the receiver to obtain the original polarity. To do this, a polarity indicating signal is inserted into said control digit. By this arrangement, the total of $m$ bits of data are transmitted over the control digit since $(m-1)$ bits of data have already been inserted into the control digit. For this, $2^m$-number of levels are used. The remaining k-number of levels are unused in the control digit. On the contrary, $(2^m+k)$ levels are all used in $(n-1)$-number of digits of the $n$-digit code word excepting the control digit. Thus, the block synchronization necessary for decoding the signal on the receiving side can be established by utilizing the difference in the probability of occurrence of levels in the control digit and in the residual $(n-1)$ digits.

More specifically, on the receiving side, the block synchronization is established by utilizing the notified information that $k$-number of levels out of $(2^m+k)$-number in specific one of $n$ digits does not occur. Then the polarity indicating signal is detected from the control digit to restore the polarities of the block as a whole, and thus the multilevel code is reconverted into $(m \times n)$-digit binary code.

The most primitive method for making binary $m(n-1)+1$ bits correspond to $(2^m+k)$-level $(n-1)$ digit is such that all $2^{m(n-1)+1}$ number of patterns which can be expressed by the binary $m(n-1)+1$ bit code word are detected respectively and $2^{m(n-1)+1}$ numbers of patterns are suitably selected from $(2^m+k)^{n-1}$ numbers of patterns which can be expressed by $(2^m+k)$-level $(n-1)$ digits, and the selected patterns are made to correspond to the individual detected outputs in one-to-one relationship and thus a multilevel code word is generated. The inverse conversion on the receiving side is done on the same principle as mentioned above. According to this method, however, the number of circuit elements must be greatly increased when the length of code word is long. For example, in an embodiment of this invention, 512 9-input AND gates and 16 allied OR gates must be provided for the purpose of converting binary 9 bits into 5-level 4 digits. This conversion can be greatly simplified by employing the following novel method of this invention.

It is assumed that $A_o$ is the total set of $(2^m+k)$-level $(n-1)$ digit length code words having $(2^m+k)^{n-1}$ numbers of code words, the total set having $(2^m+k)^{n-1}$ of $(n-1)$ digit code word elements using at least one of the $(2^m+k)$ levels. The set $Ao$ can be divided into two exclusive sub-sets A1 and A2. The former sub-set A1 uses at least one of $2^m$ levels excluding first specific preselected $k$ levels $li(i=1,2,---,k)$ among the $(2^m+k)$ levels, in each $(n-1)$ digit code word. The latter sub-set A2 uses at least one of the first specific levels $li$ in one or more digits of the $(n-1)$ digit code word. Therefore, the joint set (A1UA2) is equal to $Ao$.

In the transmitting side, when a specific code br in the original $[m(n-1)+1]$ digit binary code is, for example, "1" state, the multilevel code words belonging to the sub-set A1 can be easily constructed by a binary-to-$2^m$-ary code conversion. While, when the specific binary code $br$ is "0" state, several steps are needed to construct the sub-set A2. The first step is to carry out the similar binary-to-$2^m$-ary code conversion to obtain one more sub-set A1. The second step is to further divide the one more sub-set A1 into two sub-sets, one of which includes at least one of a second specific levels $l'j(j=1, 2,---,k)$ in one or more digits of the $(n-1)$ digit code word, and another of which excludes the second specific levels $l'j$ in any digits of the $(n-1)$ digit code word. Also, it is noted that each level of the second A1 can be easily constructed by an ordinary binary-to-$2^m$-ary code conversion. To construct A2, however, it is necessary to carry out several steps of code conversion. The first step is to carry out the similar binary-to-$2^m$-ary code conversion to obtain one more sub-set A1. The second step is to further divide the one more sub-set A1 into two sub-sets, one of which includes at least one of a second specific levels $l'j(j=1,2,---,k)$ in one or more digits of the $(n-1)$ digit code word, and another of which excludes the second specific levels $l'j$ in any digits of the $(n-1)$ digit code. It is also noted that of the second specific levels is different from any of the first specific levels. The third step is to convert each of the second levels $l'j$ contained in the former sub-set to the first levels $li$ one by one according to a predetermined correspondence, whereby a new sub-set A21 including at least one level of the first levels $li$ in one or more digits of the $(n-1)$ digit code, but not including the second specific level $l'j$ in any digit of the $(n-1)$ digit code, and belonging to the sub-set A2. The fourth step is to convert the remaining sub-set, in the foregoing one or more sub-set A1, at least one of $2^m$ levels excluding first specific preselected $k$ levels $li(i=1,2,---,k)$ among the $(2^m+k)$ levels, in each $(n-1)$ digit code word. The latter sub-set A2 uses at least one of the first specific levels $li$ in one or more digits of the $(n-1)$ digit code word. Therefore, the joint set (A1UA2) is equal to $Ao$.

In the transmitting side, when a specific code br in the original $[m(n-1)+1]$ digit binary code is, for example, 1 state, the multilevel code words belonging to the sub-set A1 can be easily constructed by a binary-to-$2^m$-ary code conversion. While, when the specific binary code $br$ is 0 state, several steps are needed to construct the sub-set A2. The first step is to carry out the similar binary-to-$2^m$-ary code conversion to obtain one more sub-set A1. The second step is to further divide the one more sub-set A1 into two sub-sets, one of which includes at least one of a second specific levels $l'j(j=1,2,---,k)$ in one or more digits of the $(n-1)$ digit code word, and another of which excludes the second specific levels $l'j$ in any digits of the $(n-1)$ digit code word. Also, it is noted that each level of the second A1 can be easily constructed by an ordinary binary-to-$2^m$-ary code conversion. To construct A2, however, it is necessary to carry out several steps of code conversion. The first step is to carry out the similar binary-to-$2^m$-ary code conversion to obtain one more sub-set A1. The second step is to further divide the one more sub-set A1 into two sub-sets, one of which includes at least one of a second specific levels $l'j(j=1,2,---,k)$ in one or more digits of the $(n-1)$ digit code word, and another of which excludes the second specific levels $l'j$ in any digits of the $(n-1)$ digit code. It is also noted that each of the second specific levels is different from any of the first specific levels. The third step is to convert each of the second levels $l'j$ contained in the former sub-set to the first levels $li$ one by one according to a predetermined correspondence, whereby a new sub-set A21 including at least one level of the first levels $li$ in one or more digits of the $(n-1)$ digit code, but not including the second specific level $l'j$ in any digit of the $(n-1)$ digit code, and belonging to the sub-set A2. The fourth step is to convert the remaining sub-set, in the foregoing one or more sub-set A1, but not including the first and second specific levels $li$ and $l'j$ to a new subset A22 each including at least one of $li$ and at least one of $l'j$ simultaneously. The last code conversion should be carried out word by word. However, since the number of $(n-1)$ digit code words belonging to A22 can be extremely small, the overall code conversion circuits can be constructed simply and inexpensively. It will be apparent that the joint sub-set (A21 UA22) is equal to the sub-set A2.

The size of each set or sub-sets is expressed by the following equations:

$$ao=(2^m+k)^{n-1} \quad (2)$$

$$a1=2^m(n-1) \quad (3)$$

$$a2=ao=a1=(2^m+k)^{n-1}-2^{m(n-1)} \quad (4)$$

where the number of code words belonging to A$o$, A1 and A2 are assumed to be $ao$, $a1$ and $a2$ respectively. From the Equations 1 and 4, the following inequality is obtained:

$$a2 \geq 2^{m(n-1)} \quad (7)$$

Therefore, $m(n-1)$ bit binary code can be transmitted by the use of the code words belonging to not only the sub-set A1 but also the sub-set A2. More specifically, when the specific bit $br$ in the $[m(n-1)+1]$ bit binary code is 1 state, the remaining $m(n-1)$ bit binary code can be transmitted by the use of the code words in the sub-set A1. Also, when the specific bit $br$ is 0 state, the remaining $m(n-1)$ bit binary code can be transmitted by the use of the code words in the sub-set A2.

At the receiving side, those sub-sets A1, A21 and A22 are discriminated and reconverted to the corresponding original binary codes, in the following manner. The sub-set A1 can be recovered by detecting that the first specific levels are not contained in any digits of the $(n-1)$ digit code word, and is reconverted to the original binary $m(n-1)$ bit codes. Simultaneously, it can be found that the specific code $br$ is 1 state. The sub-set A21 can be recovered by detecting that at least one of $li$ is contained in one or more digits of the $(n-1)$ digit code word and none of $l'j$ is contained in any digits of the $(n-1)$ digit code word, and is reconverted to the original binary $m(n-1)$ bit code. The sub-set A22 can be recovered by detecting that at least one of $li$ and at least one of $l'j$ are included in one or more digits of the $(n-1)$ digit code word, and is recovered to the original binary codes. Simultaneously, by detecting that at least one of $li$ is included in one or more digits of the received $(n-1)$ digit code word, it can be found that the original specific binary code br is 0 state.

The invention will be more apparent from the following detailed description taken in conjunction with the accompanying drawings, wherein.

The examples shown in this specification are based on the condition that $m=2$, $k=1$ and $n=5$. It is to be noted that the invention is not limited to this condition. For these numbers, a $n \times m = 10$ bit binary word is converted into an $n=5$ digit, $(2^m+k)=5$-level word. Of the five digits, $(n-1)=4$ are used to represent $[m(n-1)+1]=9$ bits of the binary word. The remaining multilevel digit is the control digit and is used to represent the remaining $(m-1)=$one bit of the binary word as well as representing polarity and synchronization information. The condition specified in equation 1 above is satisfied since:

$$2^{[m(n-1)+1]}=512 \leq (2^m+k)^{m-1}=625$$

Stated simply, 9 bits of binary data may convey 512 different patterns, whereas four 5-level digits may convey 625 different patterns. Thus the information content of four 5-level digits is more than adequate to convey the information content of nine binary bits.

Figure 1:
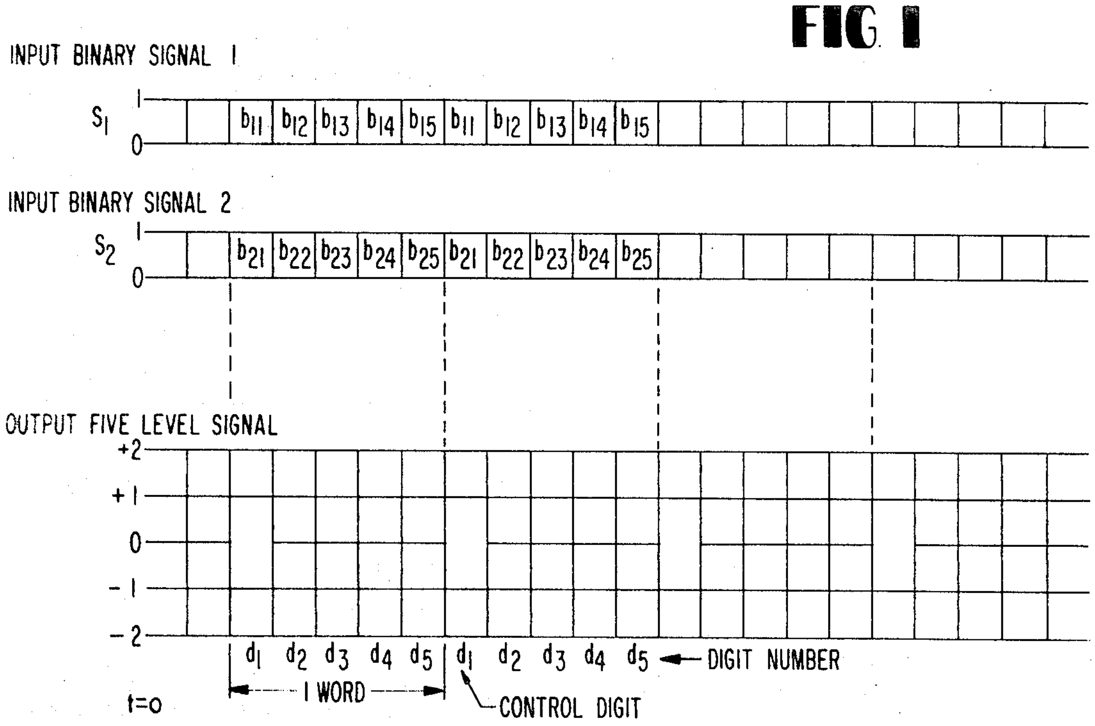
FIG. 1 is a diagram showing the principle of this invention.

Referring to FIG. 1, there is shown an embodiment of this invention wherein two systems of binary signals $S_1$ and $S_2$ are converted into 5-level signal. A set of 10 bits $b_{11}, b_{12}, ..., b_{15}$ and $b_{21}, b_{22}, ...,$ and $b_{25}$ are converted into output 5-level signals $d_1, d_2, ..., d_5$. It is apparent that instead of said two binary signals, other suitable number of binary signals may be used. The $d_1$ digit is a control digit used for the transmission of polarity indicating signal and for block (word) synchronization. This digit carries one bit data $b_{11}$ at the same time. More specifically, when $b_{11}$ is 1, $d_1$ stands at $\pm2$ level. When it is 0, $d_1$ stands at $\pm1$ level. When the polarity of $d_1$ is negative, this shows that five digits $d_1$ through $d_5$ have been subjected to polarity inversion. Nine bit data ($b_{12}$, $b_{13}$, ..., $b_{15}$, $b_{21}$, $b_{22}$, ..., $b_{25}$) is transmitted by the rest of four digits $d_2$, $d_3$, $d_4$ and $d_5$.

Figure 2:
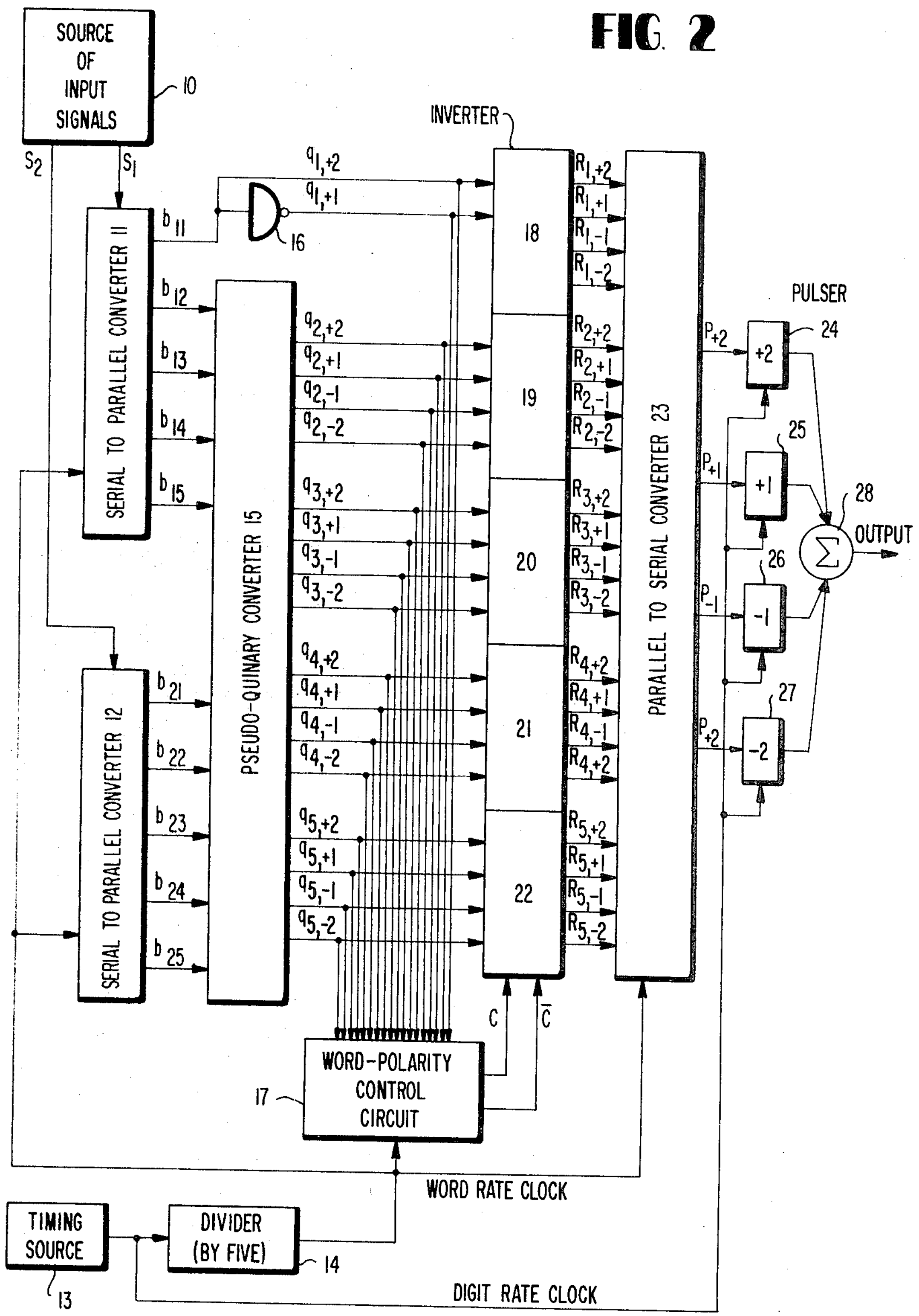
FIG. 2 is a circuit diagram showing a transmitter according to this invention.

FIG. 2 shows a transmitter of this invention for converting an input binary code into a 5-level balanced code. In FIG. 2, the reference numeral 10 denotes an input signal source, and 13 a timing source. For the purpose of facilitating the code conversion, the input binary signals $S_1$ and $S_2$ are separated into 10 bit ($b_{11}$, $b_{12}$, ... $b_{15}$, $b_{21}$, $b_{22}$, ..., $b_{25}$) parallel signals by using the word rate clock formed by dividing the digit rate clock at the ratio of 1/5 in a divider 14. This signal separation is carried out by series-parallel converters 11 and 12. The bit $b_{11}$ is made to correspond to the $d_1$ digit, and the rest of 9 bits are converted into four level-indicating signals, each representing one of the five levels by a pseudo quinary converter 15. The reference $q_{i,l}$ denotes a signal which designates that the level of $i$-th digit is $l$ when $q_{i,l}$ is 1. For example, when $q_{2,+2}$ is 1, the second digit stands at +2 level. In this case, all $q_{2,+1}$, $q_{2,-1}$ and $q_{2,-2}$ are 0. When all $q_{2,+2}$, $q_{2,+1}$, $q_{2,-1}$ and $q_{2,-2}$ are 0, the second digit stands at zero level. In the first digit, $q_{1,+2}$ is 1 when $b_{11}$ is 1, and $q_{1,+1}$ is 1 when $b_{11}$ is 0. In polarity inverters 18, 19, 20, 21 and 22, the above level indicating signals are controlled as to whether they are to be inverted by the output of the word polarity control circuit. Then the signals become five polarity-controlled level-indicating signals $R_{i,l}$. After this operation, the signals $R_{i,l}$ are serialized level by level in a parallel-to-series converter 23 whereby signals $P_{+2}$, $P_{+1}$, $P_{-1}$ and $P_{-2}$ are formed. For example $P_{+2}$ is a signal comprising serially arranged $R_{1,+2} - R_{2,+2} - R_{3,+2} - R_{4,+2} - R_{5,+2}$ (in this sequence) at certain time intervals. When these signals $P_{+2}$, $P_{+1}$, $P_{-1}$ and $P_{-2}$ are 1, pulsers 24, 25, 26 and 27 of +2, +1, −1 and −2 are driven. The resultant pulses are summed and synthesized by a summing circuit 28 whereby a 5-level balanced code output is produced. The polarity inverter is operated in the following manner. The polarity of the integrated value of the 5-level output signals transmitted by the time $t$=0 shown in FIG. 1 is compared with that of the DC component of one code word comprising $d_1$ through $d_5$ for the period following the time $t$=0. When the two polarities are coincident with each other, one code word comprising $d_1$ to $d_5$ is inverted. While, if the two polarities are discoincident, the code word is not inverted. A word polarity control circuit 17 is used for this operation. Thus, the polarity thereof is controlled so that the integrated value of the 5-level output signal is converged to zero. As a consequence, no DC component is contained in the output code train, and it becomes possible to transmit such output code train over the line with a low frequency cut-off characteristic.

Figure 3:
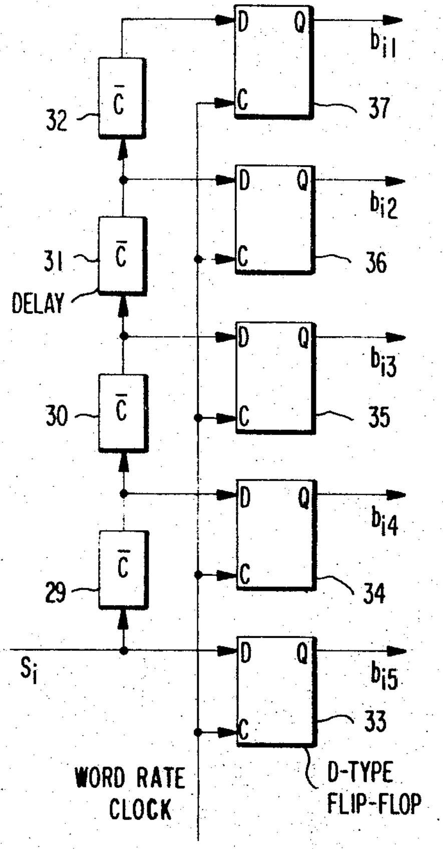
FIG. 3 shows an example of the series-parallel converter used in the circuit of FIG. 2.

The series-parallel converters 11 and 12 may be composed of the constituents as shown in FIG. 3. In FIG. 3, the signal $S_1$ or $S_2$ is read at a cycle of word rate clock by D-type flip-flops 33, 34, 35, 36 and 37. The signal is caused to pass sequentially through delay circuits 29, 30, 31 and 32 each giving one time slot delay to the signal $S_i$. Therefore, the signals appear at one time slot interval at the flip-flop outputs at 100 percent duty ratio. In other words, $b_{i1}$ through $b_{i5}$ are given as parallel signals.

Figure 4:
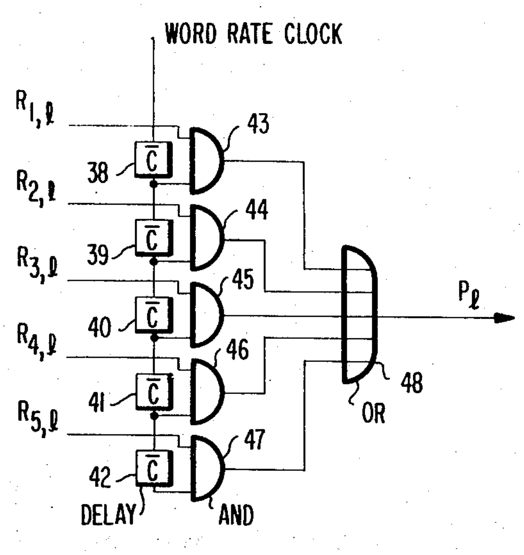
FIG. 4 shows an example of the parallel-series converter 23 used in the circuit of FIG. 2.

The parallel-series converter 23 in FIG. 2 is realized by using the circuit as shown in FIG. 4. This circuit is operated in the following manner. The signal $R_{d,l}$ which indicates the presence of a certain specific level $l$ is sampled sequentially from $d$=1 to $d$=5 in AND gates 43, 44, 45, 46 and 47 by the word rate clock pulse with one time slot width, and the sampled signals are synthesized by an OR gate 48. The word rate clock is caused to pass through one time slot delay circuits 38, 39, ..., 42 and, therefore, they are arranged serially as $R_{1,l} - R_{2,l} - R_{3,l} - R_{4,l} - R_{5,l}$.

Figure 5:
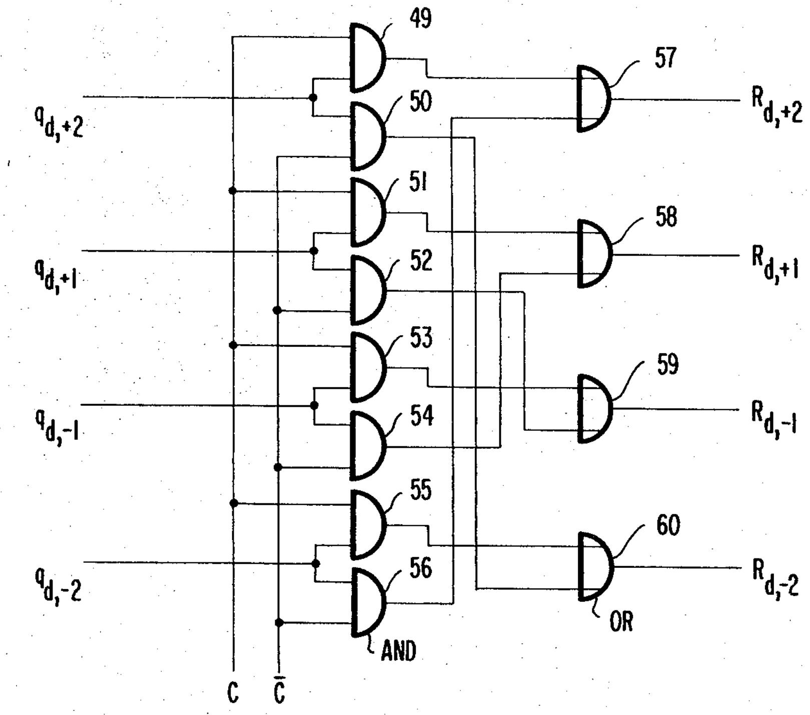
FIG. 5 shows an example of the polality inverter used in the circuit of FIG. 2.

An example of the polarity inverters 18 through 22 in FIG. 2 is shown in FIG. 5 wherein the polarity inversion is determined by the control signals C and C depending on whether the odd-numbered ones (49, 51, 53, 55) or even-numbered ones (50, 52, 54, 56) of AND gates are selected. Those outputs are combined by OR gates 57 through 60. As a result, the signals are subjected to polarity inversion, indicating the operation as shown in the following table.

TABLE 1

| C | $R_{d,+2}$ | $R_{d,+1}$ | $R_{d,-1}$ | $R_{d,-2}$ |
|---|---|---|---|---|
| 1 | $q_{d,+2}$ | $q_{d,+1}$ | $q_{d,-1}$ | $q_{d,-2}$ |
| 0 | $q_{d,-2}$ | $q_{d,-1}$ | $q_{d,+1}$ | $q_{d,+2}$ |

Figure 6:
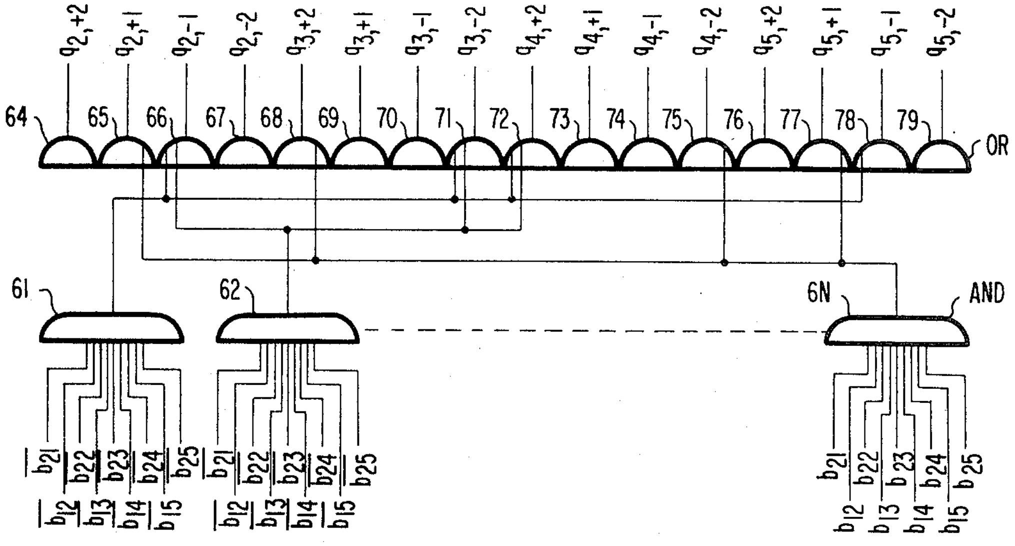
FIG. 6 shows an example of the pseudo quinary converter used in the circuit of FIG. 2.

The pseudo quinary converter 15 in FIG. 2 will be specifically described below. This quinary converter is a circuit in which 9 bits of $b_{12}$, $b_{13}$, ..., $b_{15}$, $b_{21}$, $b_{22}$, ..., $b_{25}$ are converted into four level-indicating signals, each representing one of the four levels of $q_2$, $q_3$, $q_4$ and $q_5$. In this embodiment, each of the four level-indicating signals is represented by four parallel binary signals, each indicating the presence of +2, +1, −1 and −2 levels, respectively. This converter is realized by the use of a matrix circuit as shown in FIG. 6. AND gates 61, 62 and 6N are connected to some of 16 OR gates 64 through 79 so that $2^9$(=512) patterns which are all the combinations of 9 bits are detected and predetermined 5-level patterns are generated against said 512 patterns respectively. This method is theoretically the simplest on one hand, however, a large number of circuit elements must be used on the other hand.

Figure 7:
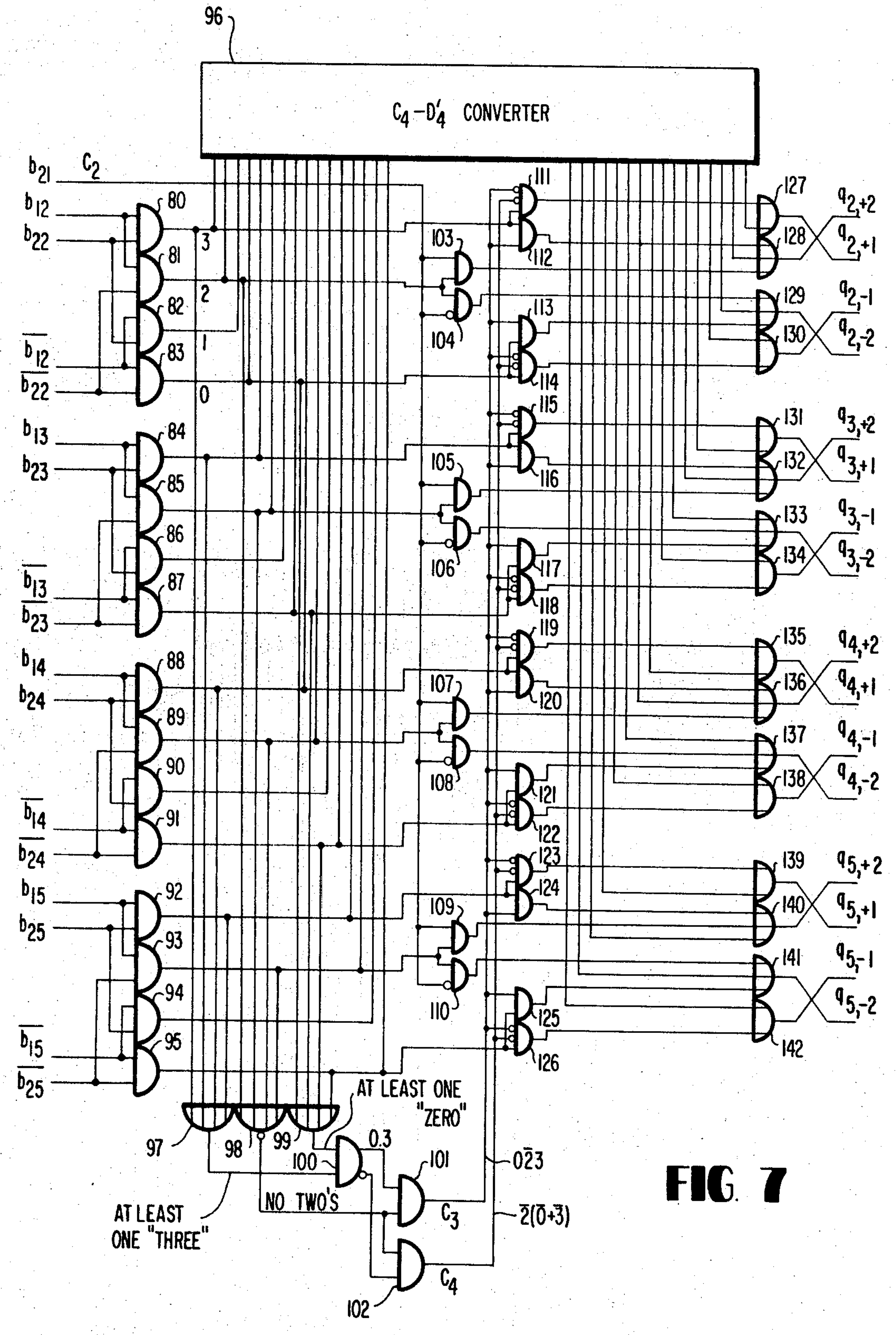
FIG. 7 shows another example of the pseudo quinary converter used in the circuit of FIG. 2.

FIG. 7 shows a circuit capable of said conversion in a simplified manner. More specifically, 8 bits out of 9 (excepting $b_{21}$) are converted into quaternary codes for two-bit pairs $b_{12}$ and $b_{22}$, $b_{13}$ and $b_{23}$, ..., $b_{15}$ and $b_{25}$. In this code conversion system, when ($b_{1k}$ $b_{2k}$) is (00), the quaternary code is zero; when (01), it is "one"; when (10), it is "two"; and when (11), it is "three". AND gates 80 through 95 are for this operation. For example, an output of "three" appears at the AND gate 80, an output of "two" at the AND gate 81, an output of "one" at the AND gate 82, and an output of "zero" at the AND gate 83.

Figure 8:
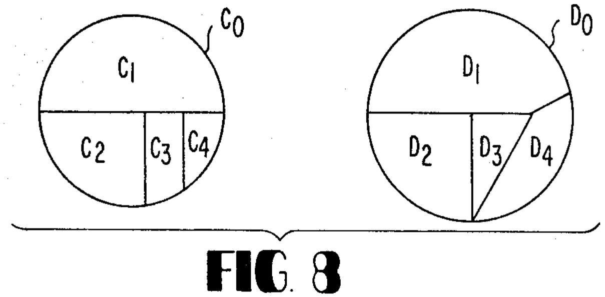
FIG. 8 shows several sets of code words for illustrating the principle of the code conversion according to this invention.

This code conversion will be described by referring to FIG. 8. The reference $C_0$ is a total set of code words consisting of binary 9 bits and is equal to the joint set $C_1 \cup C_2 \cup C_3 \cup C_4$. $C_1$ is a subset in which $b_{21}$ is 1, and a joint set $C_2 \cup C_3 \cup C_4$ is the one in which $b_{21}$ is 0. $C_2$ is a sub-set comprising at least one of "two", namely, when ($b_{1k}$ $b_{2k}$) is (10). $C_3$ is a sub-set comprising no "two" but "zero" and "three" at the same time. $C_4$ is a sub-set which does not comprise "two" and does not comprise "zero" and "three" simultaneously. Namely, the total set of code words comprising binary input 9 bits is assorted into sub-sets in the above manner.

$D_0$ is the total set of code words consisting of 5-level 4 digits and is equal to the joint set $D_1 U D_2 U D_3 U D_4$. $D_1$ is a sub-set of code words comprising no (−2)-level. A joint set $D_2$ U $D_3$ U $D_4$ is the set of code words comprising −2-level in one or more digits. $D_2$ is a sub-set of code words comprising no +2 level. $D_3$ is a sub-set of code words comprising +2 and −2-levels simultaneously and not comprising +1 and (−1)-levels. $D_4$ is a sub-set of code words comprising +2 and (−2)-levels simultaneously and also comprising at least one of +1 and (−1)-levels. The number of code words is equal in $C_1$ and $D_1$, $C_2$ and $D_2$, and $C_3$ and $D_3$, respectively but is unequal in $C_4$ and $D_4$ (it is larger in $D_4$ than in $C_4$). This is because of excess code words due to the fact that $2^9$ is smaller than $5^4$. For example, the number of code words belonging to each sub-set is as follows: 256 to $C_1$ and $D_1$, 175 to $C_2$ and $D_2$, 50 to $C_3$ and $D_3$, 31 to $C_4$, and 144 to $D_4$.

Thus, for example, four levels out of five levels (+2, +1, 0, −1, −2) are assigned to four digits of quaternary codes ("zero", "one", "two" and "three") consisting of 8 bits $b_{12}, b_{13}, \ldots, b_{15}, b_{22}, b_{23}, \ldots, b_{25}$ as shown below.

To make $C_1$ correspond to $D_1$:
"zero" → −1
"one" → 0
"two" → +2
"three" → +1

To make $C_2$ correspond to $D_2$:
"zero" → −1
"one" → 0
"two" → −2
"three" → +1

To make $C_3$ correspond to $D_3$:
"zero" → −2
"one" → 0
"three" → +2

For $C_4$, however, it is impossible to establish the digit to digit correspondence as above. This is why a $C_4$-$D'_4$ converter 96 as in FIG. 7 is used, whereby the code words contained in $C_4$ are separately detected and then converted into the identical number code words selected from $D_4$. This converter is operated on the same principle as that of the circuit shown in FIG. 6.

It is noted that the sub-sets D1 and D2 correspond to the above-mentioned sub-sets A1 and A21 respectively, and the sub-set (D3UD4) to the sub-set A22; that the (−2)-level and (+2)-leVel correspond to the specific levels *li* and *l'j* respectively; and that, in this embodiment, the sub-set (D3UD4) corresponding to A22 is further divided to the sub-sets D3 and D4 in order to further simplify the code conversion circuits.

Through the above conversion, $b_{21}$ is transmitted indirectly according to whether the code word of $D_1$ is used or other code words are used. For example, when −2-level is not contained in the received 5-level 4 digit code word, $b_{21}$ is 1. When −2-level is in the 5-level 4 digit code word, $b_{21}$ is 0.

In FIG. 7, AND gates 103, 105, 107, 109 and inhibit gates 104, 106, 108 and 110 are switched for $D_1$ or not $D_1$ according to the value of $b_{21}$. When $b_{21}$ is 1, "two" is made to correspond to +2-level. When $b_{21}$ is 0, "two" is made to correspond to −2-level. OR gates 97, 99, NOR gate 98, AND gates 100, 101 and 102 are used to detect the input signal belonging to $C_3$ and $C_4$. When the input signal belonging to $C_3$ is detected, AND gates and inhibit gates 111 through 126 are operated to switch from "zero" to −2 and "three" to +2. When the input signal belonging to $C_4$ is detected, an inhibit pulse is sent to the inhibit gates 111, 114, 115, 118, 122, 123 and 126, and a signal is supplied from the $C_4$-$D'_4$ converter 96 to OR gates 127 through 142. In this way, the code conversion is done from binary 9 bits into the four level-indicating signals by the circuit having a smaller number of circuit elements than the circuit as in FIG. 6.

The word polarity control circuit 17 is operated in the following manner. In the prior art for polarity control based on the integrated value of output code train, the multilevel signal which is the output of the summing circuit is integrated directly and then fed back in the manner described in U.S. Pat. No. 3,560,856 issued to H. Kaneko and also in U.S. Pat. No. 3,369,229 issued to Dorros. According to this method, however, the round delay time of the feedback loop is so large that normal control can hardly be maintained at a high operating speed. To remove this drawback, the present invention employs a novel control method. This control method is applicable also to the code converter of integration control type used for any other block balanced code conversion.

Figure 9:
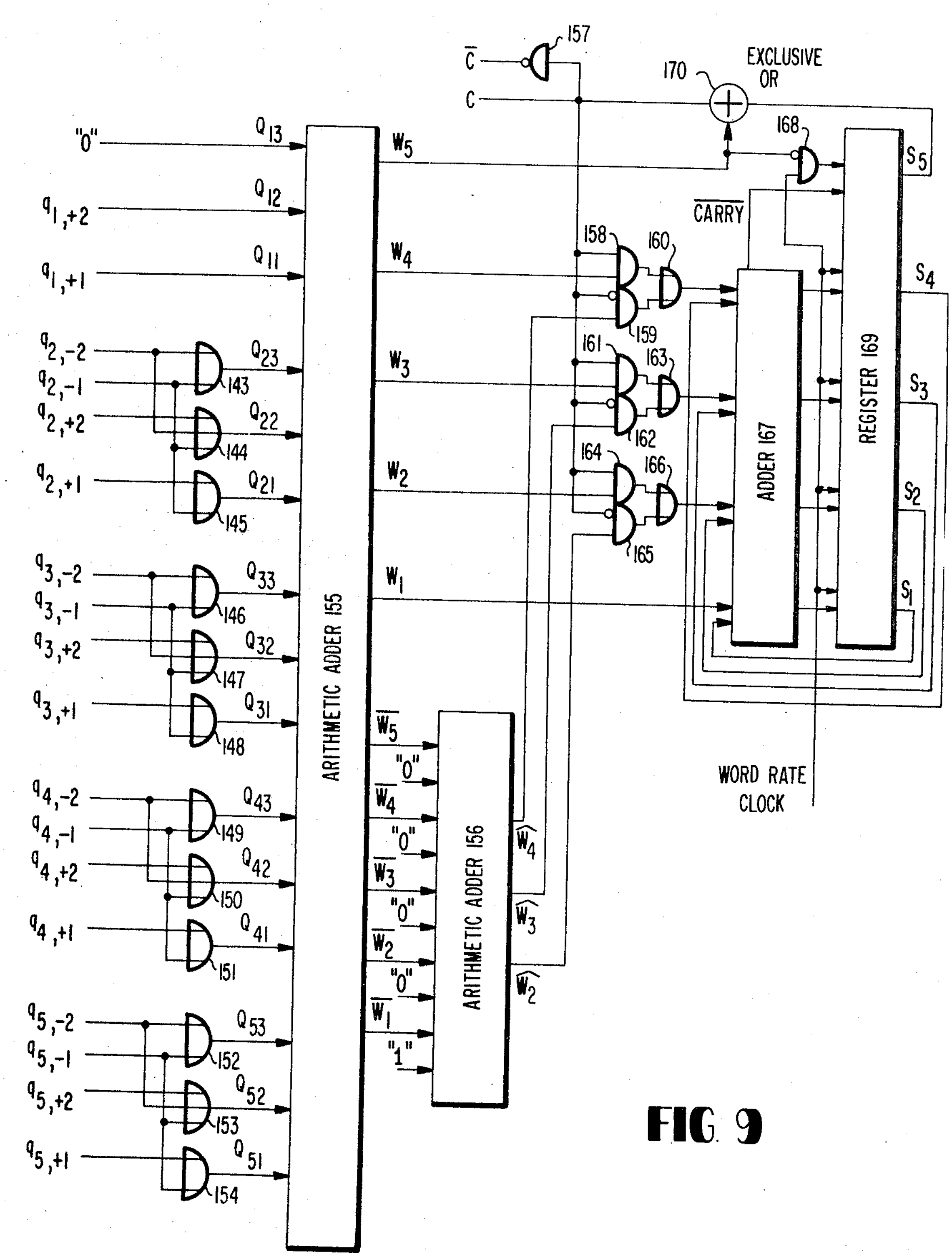
FIG. 9 shows an example of the word-polarity control circuit used in the circuit of FIG. 2.

An example of this word-polarity control circuit is shown in FIG. 9 wherein control signals C and $\overline{C}$ are produced. In FIG. 9, $q_{i,l}$ are the level-indicating signals applied to the polarity inverters 18, 19, 20, 21 and 22 of FIG. 2. A circuit comprising OR gates 143 through 154 is used for converting these signals $q_{i,+2}$, $q_{i,+1}$, $q_{i,-1}$ and $q_{i,-2}$ into 3-bit binary code ($Q_{i3}$ $Q_{i2}$ $Q_{i1}$). If the level indicated by $q_{i,l}$ is given in negative polarity, the 3-bit binary code is expressed by 2's complementary form. For example, when the second digit is +2 ($q_{2,+2}$='1'), the output of ($Q_{23}$ $Q_{22}$ $Q_{21}$) is (010). When it is −1 ($q_{2,-1}$='1'), the output is (111). The first digit $q_{1,l}$ takes no negative polarity but +2 or +1. Therefore ($Q_{13}$ $Q_{12}$ $Q_{11}$) is to be expressed as (0 $q_{1,+2}$ $q_{1,+1}$). In an arithmetic adder circuit 155, the arithmetic sum of 5 digits $q_{1,l}$ through $q_{5,l}$, that is, $(Q_{13} Q_{12} Q_{11}) + (Q_{23} Q_{22} Q_{21}) + (Q_{33} Q_{32} Q_{31}) + (Q_{43} Q_{42} Q_{41}) + (Q_{53} Q_{52} Q_{51})$, is calculated. The ordinary full adder circuit may be used for the circuit 155. The output of this circuit is of a 5-bit binary signal comprising ($W_5$ $W_4$ $W_3$ $W_2$ $W_1$) in the order of upper to lower digits. $W_5$ indicates the sign. In an arithmetic adder circuit 156, 1 is added to the complementary output ($\overline{W}_5$ $\overline{W}_4$ $\overline{W}_3$ $\overline{W}_2$ $\overline{W}_1$) to produce the 2's complements sum ($\hat{W}_5$ $\hat{W}_4$ $\hat{W}_3$ $\hat{W}_2$ $\hat{W}_1$) of the binary signal ($W_5$ $W_4$ $W_3$ $W_2$ $W_1$). Note that $W_1$ is equal to $\hat{W}_1$ because of the property of 2's complementary form.

At the beginning of operation, a redundant initial value or an integrated value of the signals which have been sent out is stored in a register 169 in the binary form ($S_5$ $S_4$ $S_3$ $S_2$ $S_1$) where $S_5$ is a sign bit. The maximum algebraic level sum of 5-level 5 digits code is +10 or −10 and, hence, there is no possibility of causing overflow in the 5-bit register. The polarity of the algebraic level sum of the code word to be transmitted is given by $W_5$. When the polarities of $W_5$ and $S_5$ are compared and found to be the same, it is necessary that the corresponding code word is transmitted after inverting its polarity. In this state, the control signal $\overline{C}$=1, C=0 is generated. At the same time, the polarities of the code word must be inverted, summed and stored in the register 169. To do this, ($\hat{W}_4$ $\hat{W}_3$ $\hat{W}_2$ $W_1$) is selected by selection gates 158, 159, ..., 166 and summed by an adder circuit 167 to form new ($S_4$ $S_3$ $S_2$ $S_1$). Then this code word is stored in the register 169 at the timing determined by the word rate clock. The sign bit is always complementary. Therefore it is not necessary to sum this bit: the complement of the carry of the most significant digit of the adder 167 gives the sign of the resultant new integrated value. The feedback loop is limited to only the circuit comprising the register 169, adder 167, exclusive OR 170 and selection gates, and thus the operating speed can be increased. Why the clock of the sign bit register is inhibited by an inhibit gate 168 is because it is necessary to prevent the sign bit from being inverted when the content of the resistor is 0 and the content of the input is also 0.

A code converter of the transmitter of this invention for converting a binary input into a 5-level code signal as in FIG. 1 is realized in the manner described above.

The operation in which the 5-level code is repeated during its transmission and reconverted into the original binary code on the receiving side will be described below.

Figure 12:
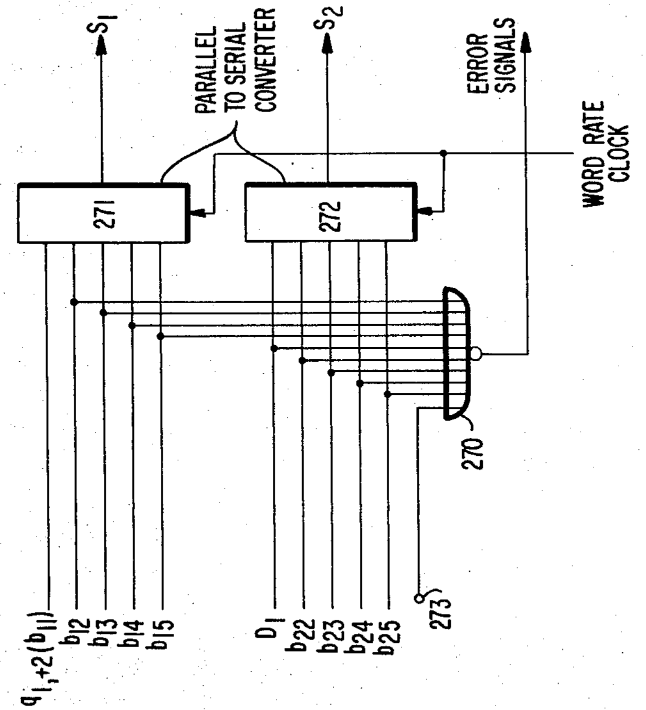
FIGS. 10, 11 and 12 illustrate a receiver according to this invention.
Figure 10:
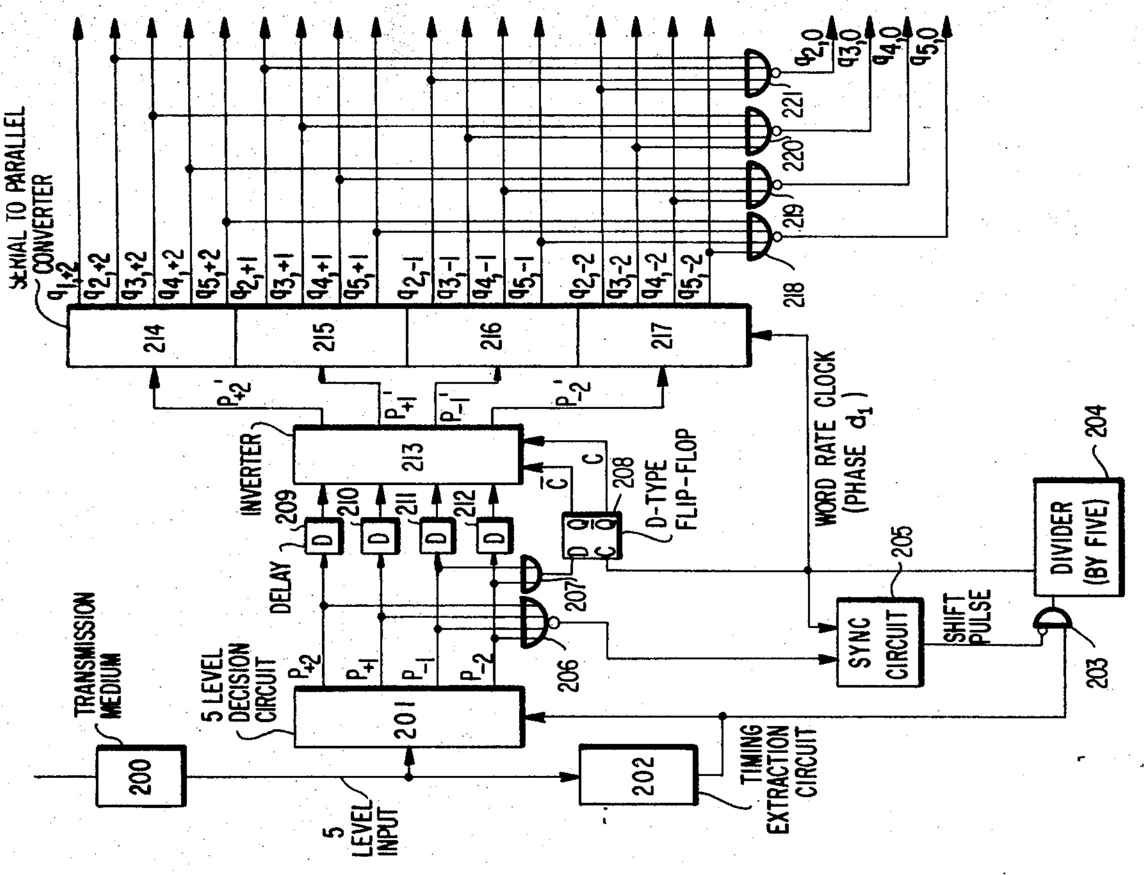
Figure 11:
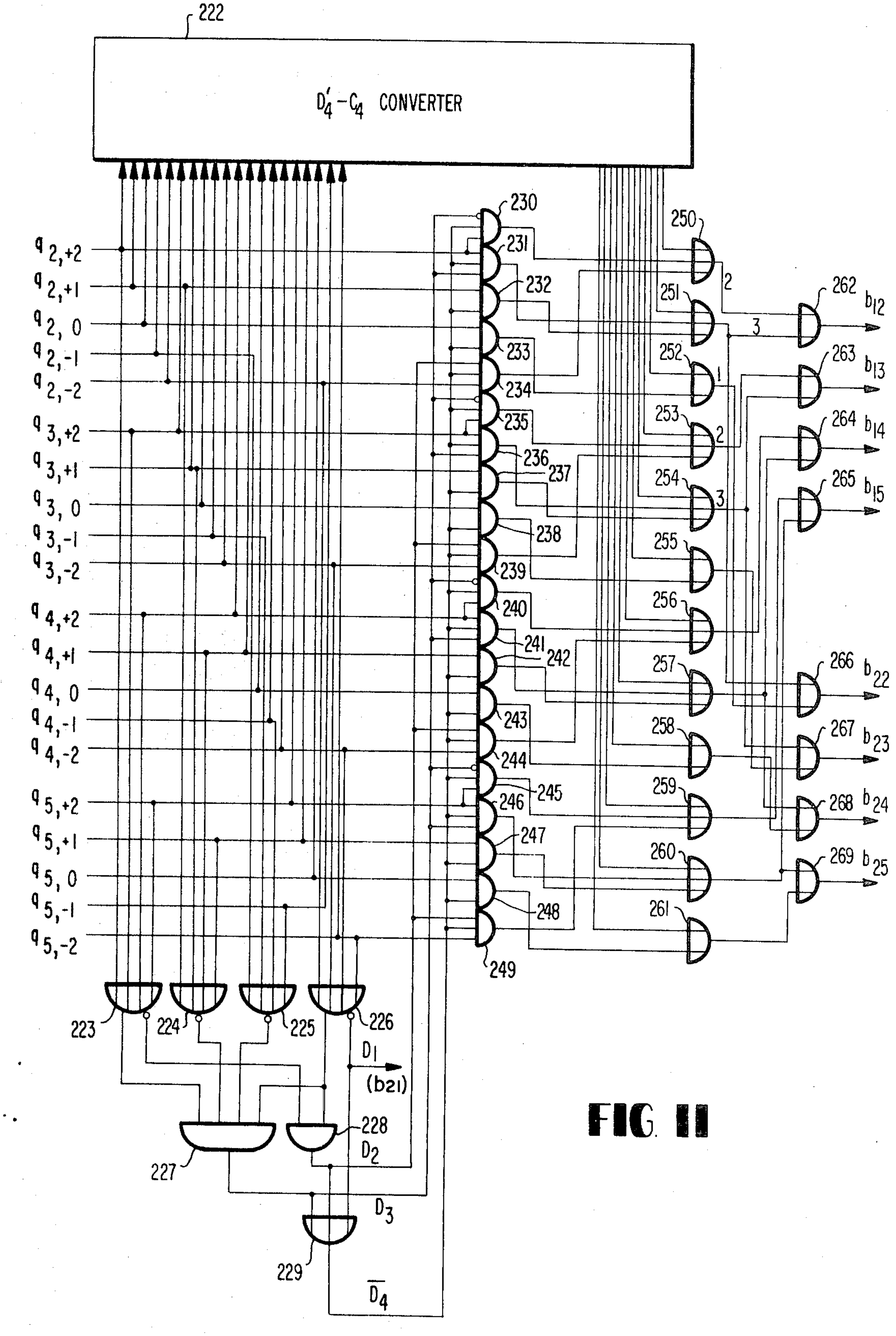

FIGS. 10, 11 and 12 illustrate in combination a reconverter of the receiver of this invention.

The 5-level signal given through a transmission medium 200 is applied to a 5-level decision circuit 201 and timing extraction circuit 202. The timing extraction circuit 202 extracts the digit rate clock, to operate the 5-level decision circuit 201 whereby the level of the receiving signal is discriminated. The 5-level decision circuit 201 delivers an output 1 to the output line corresponding to the discriminated level (for example, $P_{+2}$ line when the level is +2). When no output appears in any of the output lines $P_{+2}$, $P_{+1}$, $P_{-1}$ and $P_{-2}$, this shows that zero level signal is received. A NOR gate 206 delivers an output when zero level is detected.

The digit rate clock supplied from the timing extraction circuit 202 is applied to a frequency divider 204 in which the digit rate clock is divided by five and a word rate clock is produced. Word (block) synchronization is done in such manner that synchronous check is made by a synchronizing circuit 205 and, if out-of-synchronizations is found, one bit of digit rate clock is inhibited by an inhibit gate 203, and the phase of the word rate clock is shifted to one bit. Since one word consists of 5 digits, correct synchronization can be recovered by shifting the word rate clock four times at most. Synchronization is checked by utilizing the fact that zero level does not occur in $d_1$ digit as shown in FIG. 1. More specifically, the output of the NOR circuit 206 is sampled by the word rate clock with $d_1$ digit phase on the receiving side. When the receiver is in the synchronized state, the sampled result is always 0. If the receiver is not in that state, 0 and 1 occur at a certain probabilistic rate. By utilizing such deviation of occurrence probability of the sampled result, the conventional synchronizing method can be used.

Thus, after establishing word (block) synchronization, a binary code is obtained by the following operation. First, the polarity of the multilevel code must be inverted because polarity control has been applied to the multilevel code for the purpose of balancing the DC component. To do this, OR decision is made on $P_{-1}$ and $P_{-2}$ by an OR circuit 207, to discriminate whether the polarity of the $d_1$ digit is negative or positive. The result of this polarity decision is stored in a flip-flop 208 for the period of one word. When the $d_1$ digit is negative, a polarity inverter 213 is operated to invert $P_{+2}$ to $P_{-2'}$, $P_{+1}$ to $P_{-1'}$, $P_{-1}$ to $P_{+1'}$ and $P_{-2}$ to $P_{+2'}$. This circuit is operably similar to the circuit shown in FIG. 5. The purpose of delay circuits 209, 210, 211 and 212 is to compensate for the delay time required for polarity decision. After restoration of the word polarity, the individual digits are separated in parallel according to the level based on the word rate clock. This operation is done by series-parallel converters 214, 215, 216 and 217 in order to facilitate conversion operation. For example, $P_{+2'}$ is separated into parallel signals: +2 signal $q_{1,+2}$ of first digit, +2 signal $q_{2,+2}$ of second digit, and so forth. This series-parallel converter is similar to the circuit shown in FIG. 3. NOR with respect to +2, +1, −1 and −2 is extracted for each digit by NOR circuits 218, 219, 220 and 221 which are for obtaining zero level signal. Group decision is made on $D_1$, $D_2$, $D_3$, $D_4$ according to the signal $q_{i,l}$. Thus the code is reconverted for each group.

Gate circuits 223, 224, 225, 226, 227, 228 and 229 of FIG. 11 are to make decision on $D_1$, $D_2$, $D_3$, $\overline{D}_4$. By these decision signals, gates 230 through 249 are operated for reconversion. When the result of decision indicates that the group is $D_4$, output is inhibited from the gates 230 through 249, and the code word of $D_4'$ which is in the corresponding relation with $C_4$ in $D_4$ is reconverted by the matrix circuit in a $D_4'$-$C_4$ converter 222. The reconverted outputs of the individual groups are synthesized by OR circuits 250 through 261. Then the signal goes to the quaternary code operated as in the transmitter. Namely, the signal is converted in terms of binary code by OR circuits 262 through 269 whereby $b_{12}, b_{13}, ..., b_{15}, b_{22}, b_{23}, ..., b_{25}$ are formed. The bit $b_{21}$ is given by the output $D_1$ of the NOR circuit 226. The reverse matrix circuit similar to the circuit in FIG. 6 may be used for the circuit of FIG. 11. In this case, a large number of circuit elements is required.

The signals provided in the above circuits are converted into series signals by parallel-series converters 271 and 272 in FIG. 12 which are formed in the same manner as shown in FIG. 4. By this operation, the original binary code trains $S_1$ and $S_2$ are regenerated. For $b_{11}$, the output $q_{1,+2}$ of the series-parallel converter 214 in FIG. 10 may be used directly. Thus, a 5-level 5 digits signal is decoded perfectly into a binary 10 bits signal.

In the PCM transmission, it is essential that the line error rate be monitored in the in-service condition. According to this invention, the number of code words of $D_4$ is larger than that of $C_4$, and there are large number of unused code words (more exactly, 113 unused code words in this embodiment). Therefore the code error can be monitored by the use of these unused codes. More specifically, in the event of code error, a code word different from the originally transmitted code word comes out at a receiving point. Part of such error code word becomes present as a code word not corresponding to the input data, namely an excess code word belonging to the set which is the remainder as the result of subtraction of $D_4'$ from $D_4$. Hence, by measuring the number of occurrence of excess code word error, it is possible to monitor the line error rate.

Generally, a large number of circuit elements is required for detecting individual excess code words. According to this invention, the excess code word detection is simplified by the use of NOR gate circuit 270 shown in FIG. 12. In this method, no decoder circuit is provided for excess code word, and other decoder circuits operate to be exclusive. As a result, when an excess code word is received, all 9 bits $b_{12}, b_{13}, ..., b_{15}, b_{21}, b_{22}, ..., b_{25}$ stand at 0. Practically, there is only one word among all the multilevel code words used, which corresponds to the logic where the 9 bits are to stand all 0 0 0 0 ... 0. Therefore the excess code word can easily be detected when it is so arranged that the detected output of the one word appears at the terminal 273, the output of NOR gate 270 becomes 1 only in the case of excess code word and thus the code error can readily be detected.

What is claimed is:

1. A digital information communication system comprising:

a transmitting apparatus for converting each block of ($nxm$) binary bits in a binary signal into corresponding blocks of $n$ multilevel digits, each of said multilevel digits being ($2^m+k$)-level digit, where $n$, $m$ and $k$ are positive integers, and for transmitting said blocks of $n$ multilevel digits, said apparatus comprising, a. first means for converting $m(n-1)+1$ of said binary bits in a block into $n-1$ level-indicating signals consisting of one or more binary characters, where each one of said level-indicating signals indicates one of ($2^m+k$) levels being symmetrical about zero, b. second means for converting the remaining $m-1$ binary bits of said block of ($nxm$) binary bits into a single level-indicating signal, said second means being adapted to convert said $m-1$ bits into non-zero level indicating signals of a first polarity, c. polarity inversion means responsive to a polarity inversion control signal for converting each level-indicating signal from said first and second means into an output level-indicating signal, respectively, wherein corresponding input and output level-indicating signals indicate equal amplitude opposite polarity levels, and responsive to the absence of said polarity inversion control signal for passing said level-indicating signals from said first and second means to the output thereof without polarity inversion, d. means for converting $n$ simultaneously occurring polarity-controlled level-indicating signals from said polarity inversion means into $n$ serial ($2^m+k$)-level digits, said latter digits having respective amplitudes and polarities corresponding to said polarity-controlled level-indicating signals; and e. convolution means for generating said polarity inversion control signal in response to the algebraic sum of the levels indicated by the most recent block of said n level-indicating signals from said first and second means being of the same polarity as the algebraic sum of the prior said multilevel digits, a receiving apparatus for receiving said blocks of $n$ multilevel digits and for reconverting them back into blocks of ($n \times m$) binary bits, including, f. means responsive to each received multilevel digit for generating a level-representing signal representing the amplitude and polarity of said digit, g. means responsive to said received multilevel digits for generating timing pulses, synchronized with said received multilevel digits, h. means responsive to said level-representing signals and said timing pulses for generating a block synchronizing pulse in timed relationship with a specific digit in each of said received blocks, i. logic means responsive to said block sync pulses and said level-representing signals for generating a polarity inversion control signal when said specific digit of a code has a polarity opposite to said first polarity, j. polarity inversion means responsive to said polarity inversion control signal generated by said logic means for converting n successive level-representing signals into polarity-controlled $n$ level-representing signals which indicate like amplitude but opposite polarity, and responsive to the absence of said polarity inversion control signal for passing $n$ successive level-representing signals from said generating means directly, without polarity indication change, to the output thereof, and k. multilevel-to-binary converters means for converting the outputs from said polarity inversion means into a corresponding group of ($m \times n$) binary bits.

2. The system as claimed in claim 1 wherein said convolution means comprises, a. means responsive to each group of n level-indicating signals from said first and second means for generating a first algebraic sum indication code ($W_5 - W_1$) indicating the levels represented by said $n$ level-indicating signals and for generating a second algebraic sum indication code which corresponds to a polarity inversion of said first algebraic sum, b. storage means for storing an integral sum indication code indicating the integral sum of the levels represented by said $n$ level-indicating signals, c. comparing means for comparing the polarity of said stored integral sum indication code with the polarity of said first algebraic sum indication code, d. generating means responsive to said comparing means for generating said polarity inversion control signal when the polarities of said integral sum indication code and said first algebraic sum indication code are the same, and e. selecting means responsive to said comparing means for adding said first algebraic sum indication code to said stored integral sum indication code when said polarities are opposite and for adding said second algebraic sum indication code to said stored integral sum indication code when said polarities are the same, to form an updated stored integral sum indication code.

3. The system as claimed in claim 1 wherein said block synchronizing means in said receiver comprises, a. synchronous circuit means responsive to the coincidence of pulses applied to first and second input terminals thereof for generating a shift pulse, b. logic means, connected to the output of said level-indicating signal generating means, for developing a first pulse each time the level-indicating signal from said generating means indicates one or more specific levels, said first pulse being applied to the first input of said synchronous circuit means, c. divider means responsive to input pulses applied thereto for generating one output pulse for every $n$ input pulse thereto, said output pulses being applied to the second input terminal of said synchronous circuit means, d. shift means responsive to said timing pulses and said shift pulses for applying every timing pulse, not in coincidence with a shift pulse, to said divider means.

4. The system as claimed in claim 3 wherein logic means for generating a polarity inversion control signal comprises, a. bistable circuit means providing said polarity inversion control signal as an output in one stable state and a not polarity inversion control signal in the other stable state, b. gating means connected to the output of said level-indicating signal generating means for generating a gating pulse when said received digit has a second polarity, opposite to said first polarity, and c. means for triggering said bistable circuit in response to each pulse from said divider means, said bistable circuit being triggered to the first state when said gating pulse is present and being triggered to the second state when said gating pulse is absent.

5. A system as claimed in claim 4 wherein said first means comprises, a. means for converting each group of $m$ of said binary bits into a first level-indicating signal ($q_{i,l}$) when the remaining one binary bit ($b_r$) has a first value (e.g. 1), the conversion being a one-to-one relation between the $2^m$ possible bit patterns of said group of $m$ bits and $2^m$ levels of said $2^m+k$ levels, the latter being indicated by said first level-indicating signals and excluding a first group of $k$ specific levels ($l_i$) in said $2^m+k$ levels, thereby to generate a first sub-set ($A_1$) of the level indicating signals, b. means for converting each group of $m$ of said binary bits into an intermediate level-indicating signal when said remaining one binary bit ($b_r$) has a second value (e.g. 0), the conversion being a one-to-one relation between the $2^m$ possible bit patterns of said group of $m$ bits and $2^m$ levels of said $2^m+k$ levels, the latter being indicated by said intermediate level-indicating signals and excluding said first group of $k$ specific levels, thereby to generate an intermediate sub-set ($A_1'$) of level-indicating signals, c. means for converting at least one level-indicating signal in said intermediate sub-set ($A_1'$), which indicates one of a second group of $k$ specific levels ($l_j'$) excluding said first group of $k$ specific levels ($l_i$), into a level-indicating signal indicating one of said first group of $k$ specific levels ($l_i$), thereby to generate a second sub-set ($A_{22}$) of the level-indicating signals, which includes at least one level-indicating signal indicating one of said first group of $k$ specific levels ($l_i$) and excludes the level-indicating signals indicating said second group of $k$ specific levels ($l_j'$), d. means for converting each of the remaining level-indicating signals in said intermediate sub-set ($A_1'$), which indicates one of the remaining levels excluding said first and second groups of $k$ specific levels ($l_i$, $l_j'$), into a level-indicating signal indicating one of said first group of $k$ specific levels and one of said second group of $k$ specific levels simultaneously, by a one-to-one relation, thereby to generate a third sub-set ($A_{21}$) of the level-indicating signals, which includes the level-indicating signals each indicating one of said first group of $k$ specific levels ($l_i$) and one of said second group of $k$ specific levels ($l_j'$) simultaneously.

* * * * *

UNITED STATES PATENT OFFICE
CERTIFICATE OF CORRECTION

Patent No. 3,753,113 Dated August 14, 1973

Inventor(s) RIKIO MARUTA and KIYOAKI KAWAI

It is certified that error appears in the above-identified patent and that said Letters Patent are hereby corrected as shown below:

Column 4

Lines 2 and 3, delete "having $(2^m + k)^{n-1}$ numbers of code words--

Line 38, after "that" insert "each"

Lines 49 through 68, delete "at least ... the second"

Column 5

Lines 1-24, delete "specific ... sub-set A1,"

Column 6

Line 24, delete "polality" and insert --polarity--

Column 8

Line 12, delete "C" (second occurrence) and insert --$\bar{C}$--

Column 9

Line 48, delete "(+2)-leVel" and insert --(+2)-level--

Signed and sealed this 16th day of July 1974.

(SEAL)
Attest:

McCOY M. GIBSON, JR.
Attesting Officer

C. MARSHALL DANN
Commissioner of Patents